(12) United States Patent
Hamachi

(10) Patent No.: US 8,774,188 B2
(45) Date of Patent: Jul. 8, 2014

(54) COMMUNICATION APPARATUS AND METHOD OF CONTROLLING SAME

(75) Inventor: Toshifumi Hamachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 269 days.

(21) Appl. No.: 13/288,455

(22) Filed: Nov. 3, 2011

(65) Prior Publication Data

US 2012/0113970 A1 May 10, 2012

(30) Foreign Application Priority Data

Nov. 8, 2010 (JP) ................................. 2010-250259

(51) Int. Cl.
*H04L 12/28* (2006.01)

(52) U.S. Cl.
USPC ............................ 370/392; 370/338; 370/401

(58) Field of Classification Search
None
See application file for complete search history.

(56) References Cited

U.S. PATENT DOCUMENTS

2006/0062190 A1* 3/2006 Suga .............................. 370/338
2009/0323557 A1 12/2009 Tremaine et al.

FOREIGN PATENT DOCUMENTS

JP 2004-289839 A 10/2004

OTHER PUBLICATIONS

Japanese Office Action issued in counterpart application No. 2010-250259 on Apr. 11, 2014.

* cited by examiner

*Primary Examiner* — Duc C Ho
(74) *Attorney, Agent, or Firm* — Carter, DeLuca, Farrell & Schmidt, LLP

(57) ABSTRACT

In a communication apparatus capable of communicating concurrently with a first network and with a second network different from the first network, the address of another communication apparatus in the second network is detected, whether the detected address is in use in the first network is confirmed and, when data is transmitted to the detected address in a case where it is confirmed that the detected address is in use, stores the fact that data will be transmitted to the second network.

14 Claims, 9 Drawing Sheets

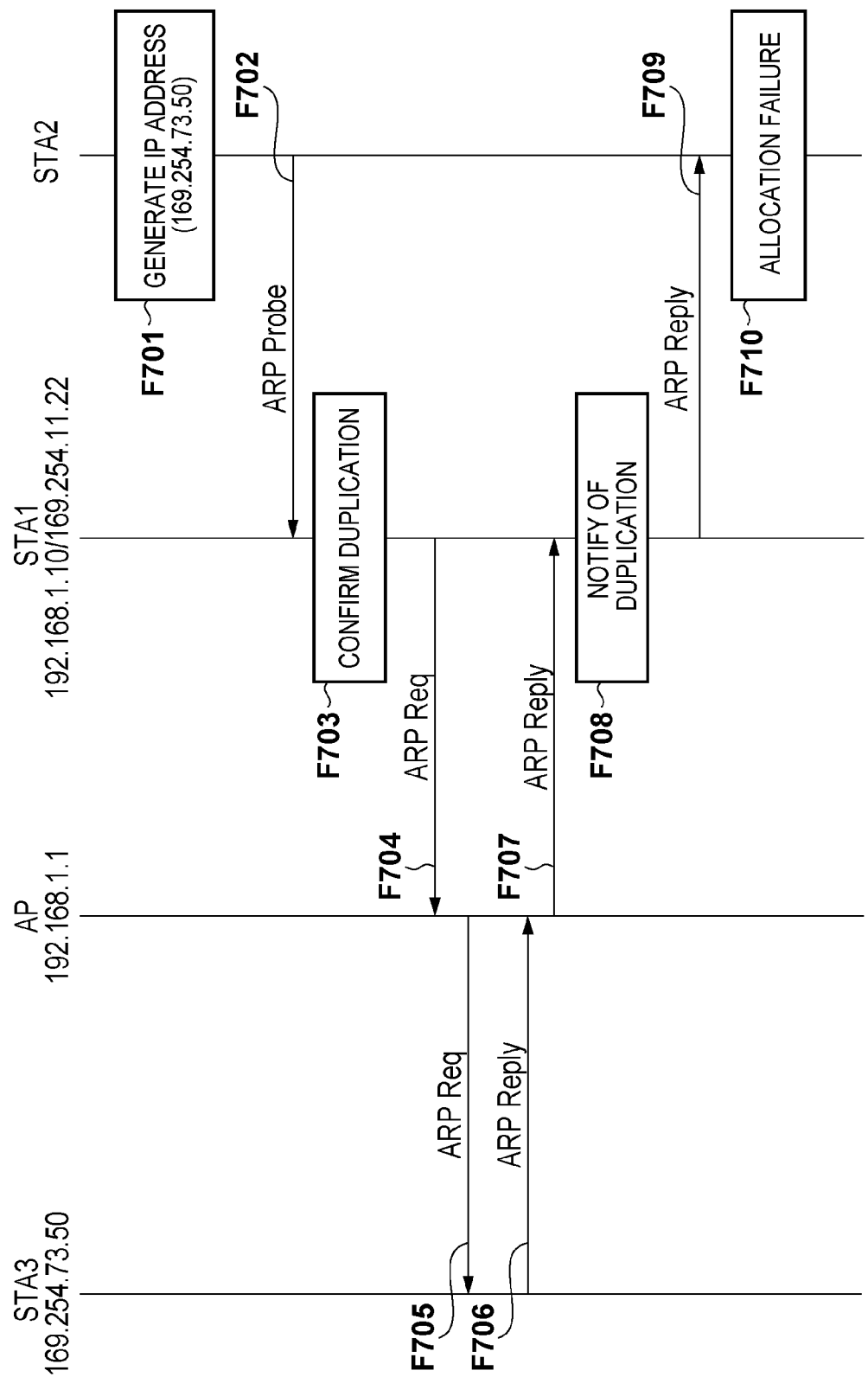

FIG. 8A

| No. | DESTINATION IP ADDRESS | GATEWAY IP ADDRESS | INTERFACE |
|---|---|---|---|
| 1 | 169.254.0.0/16 | 192.168.1.10 | WLAN(Infra) |
| 2 | 192.168.1.0/24 | 192.168.1.10 | WLAN(Infra) |
| 3 | 0.0.0.0 | 192.168.1.1 | WLAN(Infra) |

FIG. 8B

| No. | DESTINATION IP ADDRESS | GATEWAY IP ADDRESS | INTERFACE |
|---|---|---|---|
| 1 | 169.254.73.50 | 169.254.11.22 | WLAN(Adhoc) |
| 2 | 169.254.0.0/16 | 192.168.1.10 | WLAN(Infra) |
| 3 | 192.168.1.0/24 | 192.168.1.10 | WLAN(Infra) |
| 4 | 0.0.0.0 | 192.168.1.1 | WLAN(Infra) | ical layer, which is for selecting the interface to be used in communication, between a MAC layer and the IP layer (see the specification of Japanese Patent Laid-Open No. 2004-289839).

However, with conventional interface selection control using a routing table, a problem is that the interface cannot be selected appropriately in an instance where entries corresponding to identical network addresses exist. In particular, the following problem arises in a case where the infrastructure mode and adhoc mode are activated simultaneously:

In order for a terminal for which a routable address has been set to communicate with another terminal for which a link-local address has been set, an entry the destination of which is the link-local network address is registered in the routing table of this terminal. For example, in a case where an IP address 192.168.1.10 in an infrastructure mode has been set in the terminal, the following entry is registered in the routing table, by way of example;

destination IP address: 169.254.0.0/16
    gateway IP address: 192.168.1.10
    interface: WLAN (infrastructure mode)

According to this entry, the interface of the WLAN (infrastructure mode) is selected for data communication to destinations 169.254.0.0 to 169.254.255.255.

With an adhoc network, on the other hand, since a link-local address generally is used, the following entry is registered in the routing table in order to communicate with another terminal for which a link-local address has been set:

destination IP address: 169.254.0.0/16
    gateway IP address: 169.254.11.22
    interface: WLAN (adhoc mode)

According to this entry, the interface of the WLAN (adhoc mode) is selected for data communication to destinations 169.254.0.0 to 169.254.255.255.

In the setting of such routing tables, a case where the infrastructure mode or adhoc mode is used exclusively does not present a problem because only either one of the entries is registered. However, in a case where both of the entries are registered in order for both modes to be used simultaneously, two entries for which the destination IP addresses are identical will exist and, as a consequence, interface selection will no longer be performed in appropriate fashion.

Further, the method in which a layer for selecting the interface to be used in transmission is added between the MAC and IP layers necessitates a large-scale modification of the existing network stack and involves a heavy development load. Furthermore, since such a modification lacks universality, every stack used requires that a modification conforming to a respective set of specifications be performed. This is a problem since it can lead to an increase in development load.

SUMMARY OF THE INVENTION

In accordance with the present invention, there is provided a communication apparatus and method in which it is possible to transmit data from an application to an appropriate network even in a case where multiple networks communicate concurrently.

According to one aspect of the present invention, there is provided a communication apparatus capable of being simultaneously connected to and of communicating with a first network and a second network different from the first network, comprising: a detection unit configured to detect an address of another communication apparatus in the second network; a confirmation unit configured to confirm whether the address of the other communication apparatus detected by the detection unit is in use in the first network; and a storage

COMMUNICATION APPARATUS AND METHOD OF CONTROLLING SAME

BACKGROUND OF THE INVENTION

1. Field of the Invention

The present invention relates to a communication apparatus having multiple communication interfaces and to a method of controlling this apparatus.

2. Description of the Related Art

A large number of electronic devices having a wireless communication function typified by a wireless LAN (referred to also as a "WLAN" below) compliant with the IEEE 802.11 series are now available for sale. Such wireless LANs have two modes, namely an infrastructure mode and an adhoc mode. In the infrastructure mode, an infrastructure network is formed by an access point ("AP" below), which manages the wireless network, and a communication terminal (a station or "STA" below), which communicates upon being connected to the wireless network. Data communication by the STA in the infrastructure network is performed via the AP at all times.

With an infrastructure network, communication with a wide-area network ("WAN" below) is possible via the AP. To accomplish this, data communication generally uses routable addresses allocated by a DHCP server within the LAN or by a DHCP server function incorporated within the AP. The term "routable address" refers to an IP address that is transferable to a router.

In the adhoc mode, on the other hand, an adhoc network is formed by a STA alone and does not require a device to manage the wireless network. Data communication in an adhoc network is carried out directly between STAs. Further, in an adhoc network, data communication generally uses link-local addresses in view of the absence of a device for managing the network. For example, 169.254.0.0 to 169.254.255.255 are being utilized as link-local addresses in IPv4.

Devices capable of operating in both the infrastructure mode and adhoc mode simultaneously have been developed in recent years. In such a device, generally the infrastructure mode and the adhoc mode are managed internally as respective separate interfaces. For this reason, control similar to that of a device physically having multiple interfaces is necessary.

In the case of a device having multiple interfaces, control is necessary for selecting from which interface to transmit data that is to be transmitted by an application. With almost all communication applications, however, control for selecting the interface is not carried out. Consequently, control for selecting the interface used in data transmission is necessary in all layers of communication layers.

Control for selecting an interface used in data communication generally employs an IP-layer routing table. Registered in the routing table on a per-route basis is an entry in which a destination IP address, gateway IP address and interface, etc., constitute one set. If a transmit request from a higher-order layer arrives in the IP layer, an entry that matches the destination IP address of the transmission data is searched for in the IP layer. If a matching entry exists in the routing table, then the interface used in data transmission is decided based upon the interface information of the entry.

In order to control a plurality of interfaces utilizing a routing table, however, appropriate settings are necessary and, since making the settings requires expert knowledge, this is a difficult task for the general user. Accordingly, a method has been proposed in which interface selection control is performed, without setting up a routing table, by adding a hierunit which, when data is transmitted to the address in a case where this address has been confirmed by the confirmation unit to not be in use, stores the fact that data is transmitted to the second network.

Also, according to another aspect of the present invention, there is provided a method of controlling a communication apparatus capable of being simultaneously connected to and of communicating with a first network and a second network different from the first network, comprising: a detection step of detecting an address of another communication apparatus in the second network; a confirmation step of confirming whether the address of the other communication apparatus detected at the detection step is in use in the first network; and a storage step which, when data is transmitted to the address in a case where this address has been confirmed at the confirmation step to not be in use, is a step of storing the fact that data is transmitted to the second network.

Further features of the present invention will become apparent from the following description of exemplary embodiments with reference to the attached drawings.

BRIEF DESCRIPTION OF THE DRAWINGS

FIG. 7 is a diagram illustrating a processing sequence between apparatuses according to the first embodiment;

FIGS. 8A and 8B are diagrams illustrating examples of routing tables according to the first embodiment;

DESCRIPTION OF THE EMBODIMENTS

Embodiments of the present invention will be described in detail with reference to the drawings. Although the description below is rendered with regard to an example using a wireless LAN system compliant with the IEEE 802.11 series, the form of communication capable of being employed by the present invention is not necessarily limited to an IEEE 802.11-compliant wireless LAN.

First Embodiment

Figure 1:
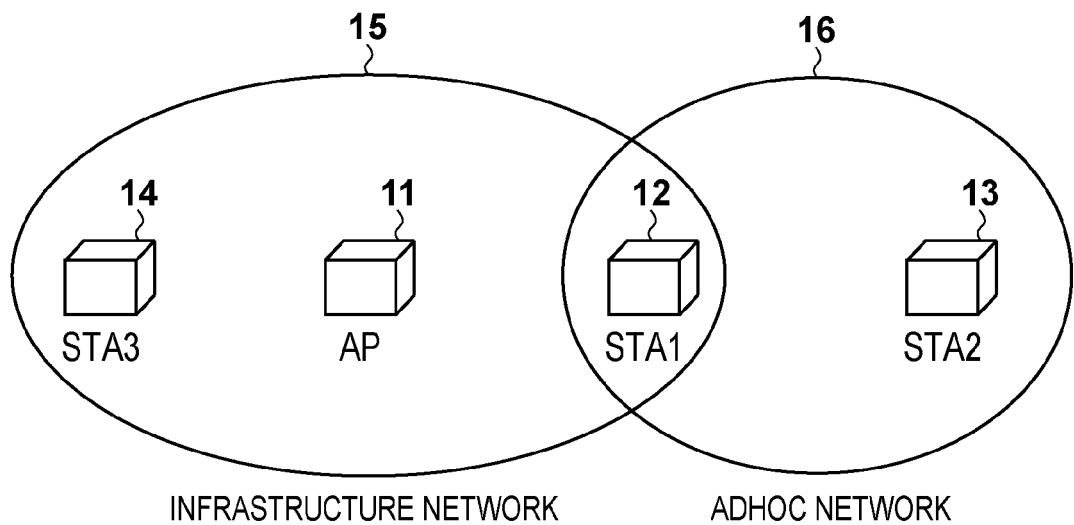
FIG. 1 is a diagram illustrating an example of a network configuration according to a first embodiment of the present invention.

FIG. 1 is a diagram illustrating an example of the configuration of a network system that includes a first station 12 ("STA1" below), which is a communication apparatus according to this embodiment, an access point 11 ("AP" below) and second and third stations 13, 14 ("STA2" and "STA3" below), respectively. The AP forms and manages a first network in which communication with a LAN and a WAN is possible. In this embodiment, an example in which an infrastructure network 15 of a wireless LAN is used as the first network will be described. The AP is connected to the WAN and a terminal under the supervision of the infrastructure network 15 is capable of communicating with the WAN via the AP. The STA1, which is capable of functioning simultaneously in both the infrastructure and adhoc modes, is connected to the infrastructure network 15 in the infrastructure mode and forms an adhoc network 16 in the adhoc mode. The STA2 forms a second network in which only communication with the LAN is possible. In this embodiment, an example in which the adhoc network 16 is used as the second network will be described. The STA3 is connected to the infrastructure network 15. The infrastructure network 15 and the adhoc network 16 operate independently and the network identifiers ("SSID" below), authentication schemes and encryption schemes, etc., may differ. The first and second networks operate concurrently, as illustrated in FIG. 1.

Figure 2:
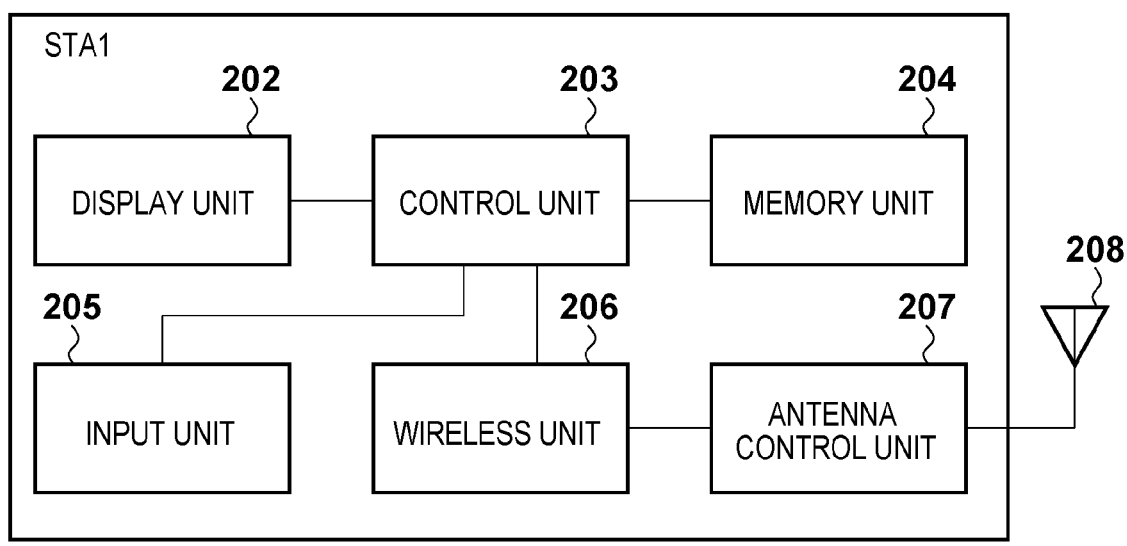
FIG. 2 is a block diagram illustrating an example of the configuration of a communication apparatus according to the first embodiment of the present invention.

FIG. 2 is a functional block diagram representing an example of the configuration of the STA1. The STA1 has a display unit 202 equipped with an LCD or LED, which functions to output information capable of being perceived visually, and/or a speaker having an audio output function, and presents a variety of displays. A control unit 203 controls the overall apparatus by executing a control program that has been stored in a memory unit 204. The memory unit 204 stores the control program executed by the control unit 203. Various operations described later are performed by having the control unit 203 execute the control program stored in the memory unit 204. An input unit 205 is used by a user in order to specify network search processing, described later, and for other inputs as well. A wireless unit 206 performs wireless communication using an antenna control unit 207 for controlling an antenna 208 to send and receive wirelessly. An arrangement having another set composed of a wireless unit, antenna control unit and antenna besides the units 206 to 208 may be adopted as an arrangement to which this embodiment is applicable.

Figure 3:
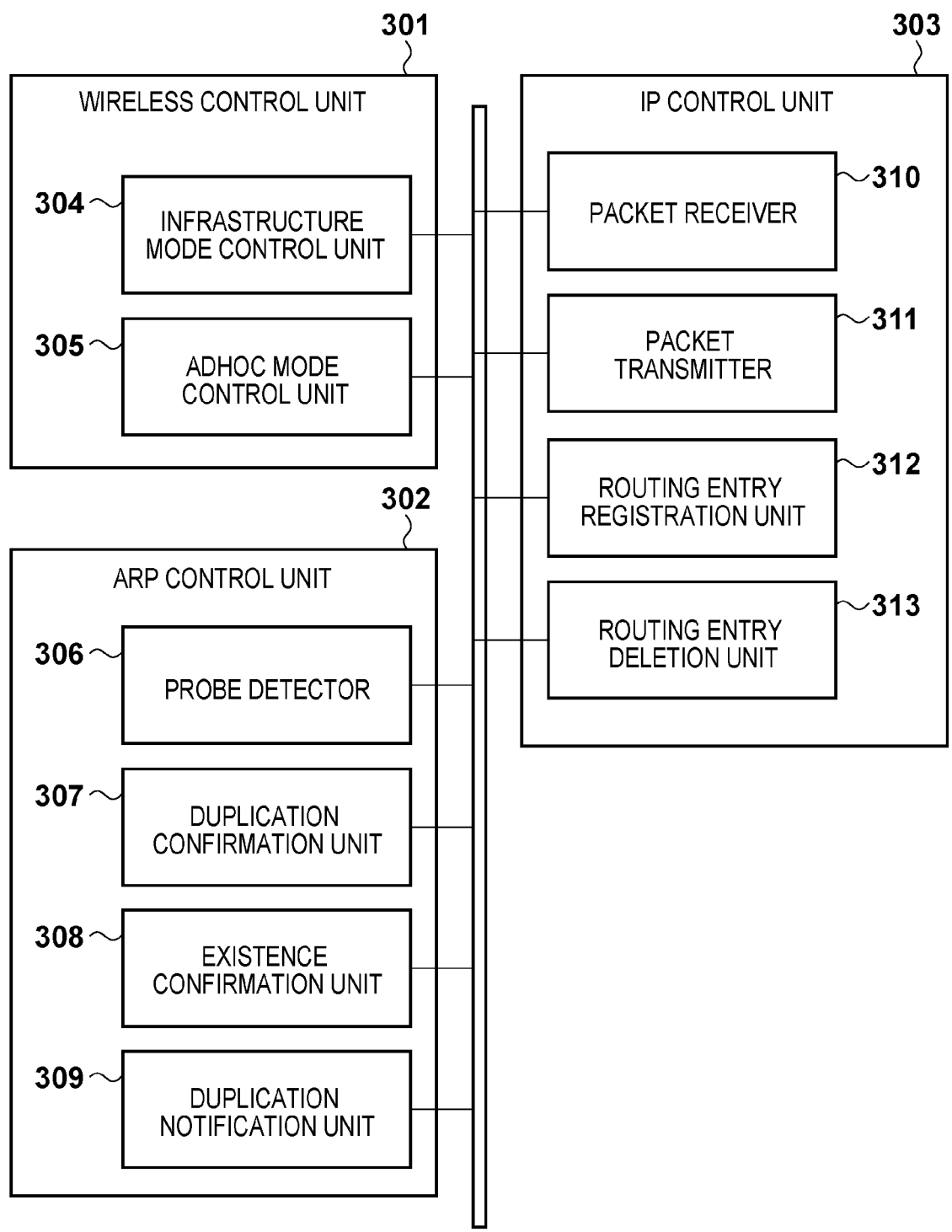
FIG. 3 is a block diagram illustrating the software function within the communication apparatus.

FIG. 3 is a block diagram illustrating an example of a configuration of software function blocks implemented by the control unit 203. A wireless control unit 301 includes functions indicated by blocks 304 and 305, described later, and controls the wireless unit 206. An ARP (Address Resolution Protocol) control unit 302 includes functions indicated by blocks 306 to 309, described later, and controls the ARP. In this embodiment, it is assumed that an ARP defined by RFC 826, for example, is used as the ARP. An IP control unit 303, which includes functions indicated by blocks 310 to 313, described later, implements Internet Protocol ("IP" below) communication control.

The wireless control unit 301 uses an infrastructure mode control unit 304 to control wireless communication in the infrastructure mode, and uses an adhoc mode control unit 305 to control wireless communication in the adhoc mode. By virtue of this arrangement, it is possible for the wireless control unit 301 to perform communication simultaneously using the infrastructure network 15, in which communication is carried out via an access point, and the adhoc network 16, in which communication is performed without the intermediary of an access point.

The ARP control unit 302 has a probe detector 306 for detecting ARP Probe transmitted by another apparatus. ARP Probe is a message transmitted in order to confirm duplication of a logical address (an IP address in this embodiment) within the same network before use of a link-local address begins. It should be noted that ARP Probe differs from an ARP Request in that a value indicative of 0.0.0.0 is set as a Sender Protocol Address ("SPA" below). The ARP control unit 302 further includes a duplication confirmation unit 307 which, depending upon whether address resolution using the ARP has succeeded or not, confirms whether terminals having identical IP addresses exist in the network. The ARP control unit 302 further includes an existence confirmation unit 308 which, depending upon whether address resolution using the ARP has succeeded or not, confirms that a terminal using a specific IP address exists in the network. A duplication notification unit 309 notifies another terminal of duplication of an IP address using an ARP packet.

The IP control unit 303 has a packet receiver 310 for receiving packets used in communication; a packet transmitter 311 for transmitting packets used in communication; a routing entry registration unit 312 for registering entries in a routing table; and a routing entry deletion unit 313 for deleting entries from the routing table.

Figure 4:
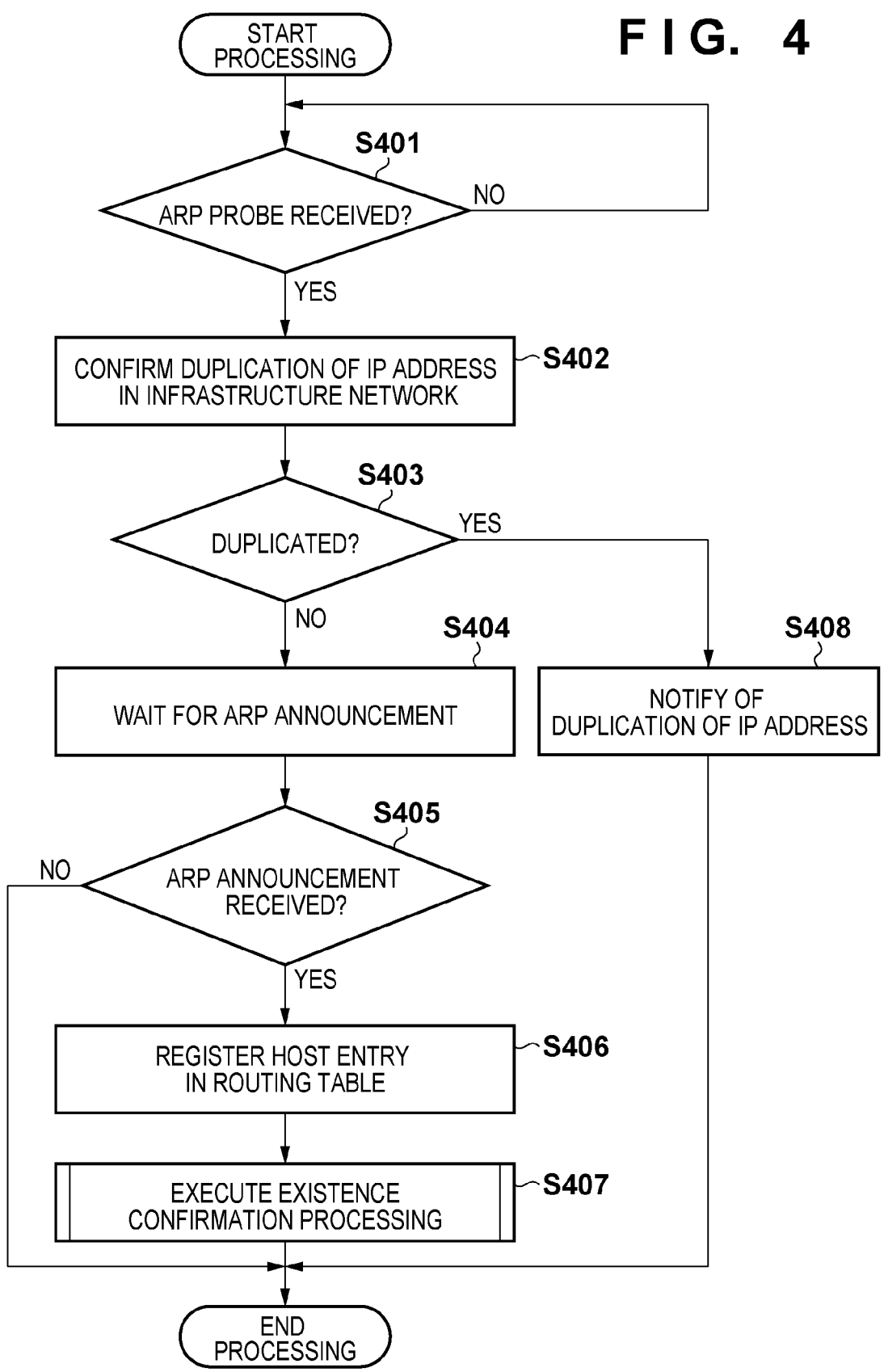
FIG. 4 is a flowchart illustrating processing executed by the apparatus according to the first embodiment.

FIG. 4 is a flowchart illustrating processing for setting the routing table of STA1 according to this embodiment. The probe detector 306 of STA1 waits until an ARP packet (ARP Probe in this embodiment) is received in the adhoc network 16 serving as the second network (step S401). If the probe detector 306 detects receipt of ARP Probe, the duplication confirmation unit 307 determines whether the logical address of the transmission source described in ARP Probe is in use in the infrastructure network 15 serving as the first network. That is, the duplication confirmation unit 307 determines whether the IP address described in ARP Probe is a duplicate in the infrastructure network 15 (steps S402 and S403).

More specifically, the duplication confirmation unit 307 determines whether an IP address identical with an IP address that has been set as a Target Protocol Address ("TPA" below) of ARP Probe received at step S401 is being used. One example of the confirmation procedure that can be mentioned is to transmit ARP Request and, if address resolution succeeds owing to return of ARP Reply, regard this as indicating that a duplicate IP address is being used. Naturally, other methods may be used. Further, in a case where there the communication apparatus has three or more communication interfaces, it is possible to implement confirmation by transmitting ARP Request from a communication interface other than a communication interface that has received ARP Probe.

If the result of the determination made at step S403 is confirmation of IP address duplication, the duplication notification unit 309 sends notification of the IP address to the terminal that transmitted ARP Probe in the adhoc network 16 (namely the terminal that requested address acquisition) (step S408). It is possible to implement notification of duplication by transmitting ARP Reply as a response to ARP Probe, and other procedures and implementations may be used as well. Further, if the result of the determination at step S403 is that there is no IP address duplication (that the IP address is unused), then receipt of ARP Announcement is awaited for a prescribed period of time (steps S404 and S405). Processing is exited if ARP Announcement cannot be received within the prescribed period of time. Conceivable examples of cases where ARP Announcement cannot be received include a case where a terminal that has transmitted ARP Probe suspends automatic IP allocation processing [Auto IP (Automatic Private IP Addressing), for example) and a case where IP addresses of other terminals are redundant within the adhoc network 16.

If ARP Announcement is received, the routing entry registration unit 312 adds a host entry, in which the IP address that has been set as a Sender Protocol Address ("SPA" below) is adopted as the destination IP address (destination logical address), to the routing table (step S406). Whereas a network entry designates a destination IP address by a range of IP addresses, a host entry designates a destination IP address by a single IP address. By using a host entry, therefore, route information with respect to a specific terminal can be registered in a routing table. When registration of the host entry is completed, the existence confirmation unit 308 then executes existence confirmation processing (step S407). When existence confirmation processing is completed, the processing of this flowchart ends. The details of existence confirmation processing at step S407 will now be described.

Figure 5:
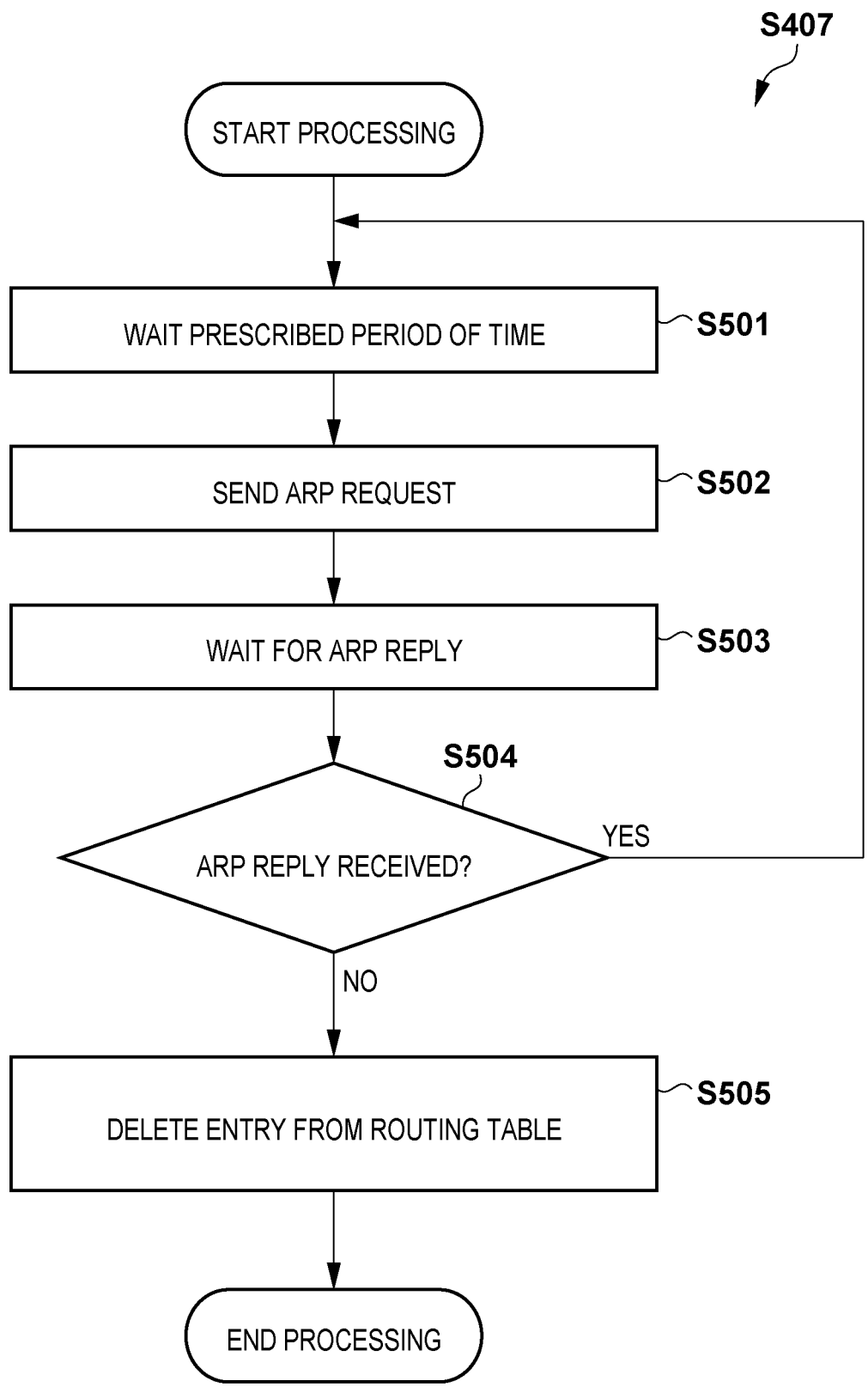
FIG. 5 is a flowchart illustrating processing executed by the apparatus according to the first embodiment.

FIG. 5 is a flowchart illustrating existence confirmation processing (step S407) executed by STA1. First, in the adhoc network 16, the existence confirmation unit 308 posts an address resolution request with respect to an IP address, which has been registered in the host entry, at a prescribed period. This processing is executed at steps S501 and S502. Specifically, the existence confirmation unit 308 first waits for a prescribed period of time (step S501). When such standby for the prescribed period of time ends, the existence confirmation unit 308 sends ARP Request in order to perform address resolution with respect to the IP address that is to undergo existence confirmation (step S502). Next, the existence confirmation unit 308 waits a fixed period of time for an address resolution reply (in this embodiment, this is ARP Reply, which is the response to ARP Request) (steps S503, S504). If it is determined that ARP Reply has been received within the fixed period of time from the sending of ARP Request ("YES" at step S504), it is judged that a terminal using the IP of interest exists, processing returns to step S501 and the existence confirmation unit 308 again waits for the prescribed period of time. On the other hand, if ARP Reply cannot be received within the fixed period of time ("NO" at step S504), then it is judged that a terminal using the IP of interest does not exist. In this case, the routing entry deletion unit 313 deletes from the routing table the host entry in which the IP address that is the target of existence confirmation is adopted as the destination IP address (step S505). When entry deletion is completed, existence confirmation processing ends.

Figure 6:
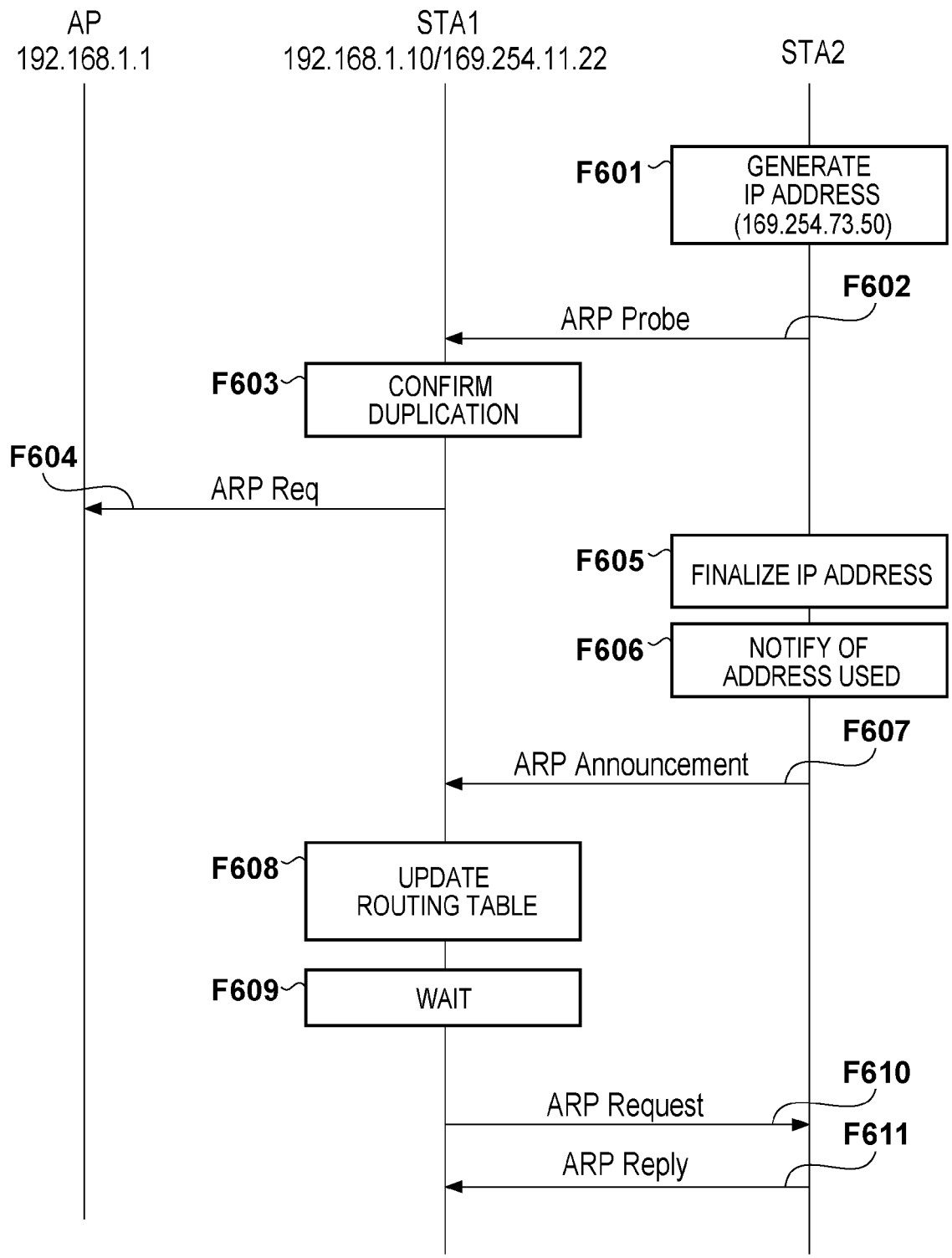
FIG. 6 is a diagram illustrating a processing sequence between apparatuses according to the first embodiment.

FIG. 6 is a sequence diagram for when STA2 sets an IP address by Auto IP in a state in which STA1 is connected to the infrastructure network 15 constructed by the AP and the adhoc network 16 is formed by STA1 and STA2. It should be noted that 192.168.1.1 has been set as the IP address of the AP. Further, 192.168.1.10 has been set as the IP address in the infrastructure mode of STA1, and 169.254.11.22 has been set as the IP address in the adhoc mode of STA1. In addition, the routing table of STA1 prevailing at the moment the sequence begins is as shown in FIG. 8A.

First, STA2 generates a link-local address (F601). In this example, it is assumed that an IP address 169.254.73.50 has been generated. Next, STA2 broadcasts ARP Probe within the adhoc network 16 as processing for detecting duplicate addresses in Auto IP (F602).

When the probe detector 306 in STA1 receives the ARP Probe of STA2, the duplication confirmation unit 307 starts duplication confirmation for confirming whether or not an identical IP address is being used in the infrastructure network 15 (F603), as explained in S401 and S402. The duplication confirmation unit 307 of STA1 broadcasts ARP Request within the infrastructure network 15 via the AP (F604). Since a terminal using 169.254.73.50 does not exist in the infrastructure network 15 in this example, ARP Reply is not sent back and the duplication confirmation unit 307 judges that a duplicate IP address does not exist.

If STA2 does not receive duplication notification (ARP Reply at step S408) upon elapse of a prescribed period of time from transmission of ARP Probe, then STA2 judges that a duplicate address does not exist and finalizes the address, which was generated at F601, as the IP address (F605). STA2 then broadcasts ARP Announcement within the adhoc network 16 (F606, F607). ARP Announcement is also referred to as a "gratuitous ARP" and, unlike an ordinary ARP Request, the IP address used by the local apparatus is set in the TPA. Upon receiving ARP Announcement, the routing entry registration unit 312 of STA1 registers a host entry in which the IP address of STA2 (the IP address that has been set in ARP Announcement) is adopted as the destination IP address (F608).

The routing table modified at F608 is shown in FIG. 8B. The interface of the WLAN (adhoc mode) is selected for the data whose destination is 169.254.73.50 by entry No. 1 of the routing table. Further, for data transmission of destinations 169.254.0.0 to 169.254.255.255 other than 169.254.73.50, the interface of the WLAM (infrastructure mode) is selected by entry No. 2.

When entry registration is completed, the existence confirmation unit 308 of STA1 waits a prescribed period of time (F609) and starts address resolution processing of the IP address of STA2 in order to perform existence confirmation of this entry. That is, the existence confirmation unit 308 of STA1 broadcasts ARP Request within the adhoc network 16 (F610) and receives ARP Reply from STA2 (F611), thereby confirming the existence of STA2. Thereafter, the existence confirmation unit 308 repeatedly executes the processing of F609 to F611. If existence of STA2 cannot be confirmed, the routing entry deletion unit 313 deletes the host entry registered at F608.

Next, an example of operation in a case where duplication has been confirmed in the infrastructure network 15 will be illustrated with reference to FIG. 7. FIG. 7 is a sequence diagram for when STA2 sets an IP address by Auto IP in a state in which STA1 and STA3, which is the third station 14, are connected to the infrastructure network 15 constructed by the AP, and the adhoc network 16 is formed by STA1 and STA2.

The processing of F701 to F704 is similar to that of F601 to F604. Upon receiving ARP Request (F705), STA3 determines that the Target Protocol Address (TPA) is the same as the IP address of its own apparatus. Upon determining that the TPA of ARP Request is the same as the IP address of its own apparatus, STA3 sends back ARP Reply to STA1 via the AP (F706, F707). The duplication confirmation unit 307 of STA1 that has received this ARP Request determines that the IP address that STA2 is attempting to allocate is in use within the infrastructure network 15 (F708). The duplication notification unit 309 then sends STA2 an ARP Reply in order to give notification of duplication of the IP address (F709). Upon receiving ARP Reply, STA2 determines that the IP address generated at F701 is a duplicate and abandons use of the identical IP address (F710). If address allocation fails, STA2 re-executes Auto IP processing from generation of the IP address.

In the first embodiment set forth above, the invention is described taking as an example a communication apparatus having two communication interfaces, one for the infrastructure mode and one for the adhoc mode. However, the present invention is applicable also in a case where there are other communication interfaces. For example, the invention is applicable to a communication apparatus in which the two communication interfaces are an Ethernet (registered trademark) interface and a wireless LAN interface. Further, the invention is applicable to a communication apparatus having three or more communication interfaces.

In the first embodiment, the invention is described taking as an example in which an ARP is used in order to manage an IPv4 routing table. However, the invention is not limited to such an arrangement. For example, by using Neighbor Solicitation and a Neighbor Discovery Protocol (NDP) compliant with ICMPv6, instead of using an ARP, it is possible to implement similar operation even with IPv6. It should be noted that NDP is defined by RFC 2461.

In accordance with the first embodiment, as described above, it is possible for a communication apparatus to suitably manage a host entry with respect to another terminal within the adhoc network 16. As a result, it is possible to communicate also with a terminal for which a link-local address has been set in the adhoc network 16 while a state in which communication is possible with a terminal for which a link-local address has been set in the infrastructure network 15 is maintained.

In the description above, confirmation of address duplication is performed using ARP Probe. However, it may be arranged so that address duplication confirmation is carried out using another ARP packet, such ARP Request or ARP Announce.

Second Embodiment

A second embodiment of the present invention will now be described in detail with reference to the drawings. In the first embodiment, if an IP address generated by STA2, which is a communication apparatus in the adhoc network 16, is an IP address not used in the infrastructure network 15, then the entry information concerning this IP address is registered in a routing table as a host entry. In the second embodiment, the entry information is registered in the form of a host entry in a case where the unused IP address is included in the destination and, moreover, a network entry corresponding to an interface other than that of the second network exists. In other cases, the entry information is registered in the form of a list in which a network entry corresponding to the interface of the second network and the IP address have been registered. It should be noted that the configuration of the network system and the configuration of the communication apparatus in the second embodiment are similar to those of the first embodiment and are as described above with reference to FIGS. 1 to 3. In the second embodiment, a method of managing a routing table for allowing STA1 to communicate with STA2 in a manner similar to the first embodiment will be described.

Figure 9:
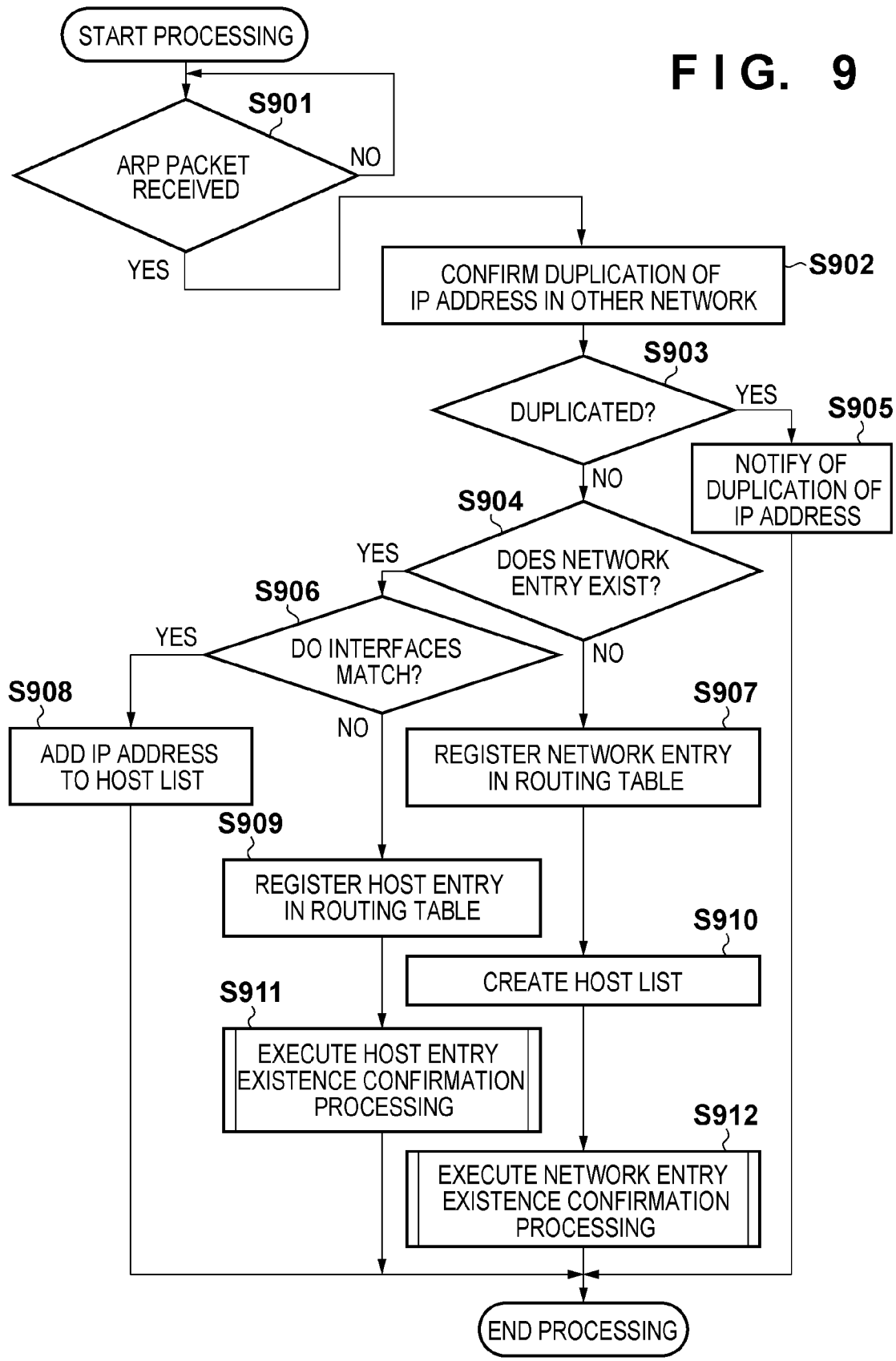
FIG. 9 is a flowchart illustrating processing executed by an apparatus according to a second embodiment of the present invention.

FIG. 9 is a flowchart for describing processing for allowing STA1 to manage a routing table in the second embodiment. STA1 waits until an ARP packet is received by the packet receiver 310 (step S901). It should be noted that the ARP packet contains ARP Request, ARP Probe and ARP Announce, etc., and all of these packets may be adopted as targets or a packet may be limited to a specific packet.

Upon receiving the ARP packet, the duplication confirmation unit 307 of STA1 performs IP address duplication confirmation in the other network in a manner similar to step S402 (steps S902, S903). If the result of the confirmation is IP address duplication, the duplication notification unit 309 sends notification of duplication to the transmission source of the ARP packet in a manner similar to step S408 (step S905). If it is determined that duplication has not occurred, on the other hand, then the routing entry registration unit 312 determines whether the network address that includes the IP address has already been set in the routing table (step S904). For example, if the IP address acquired from the ARP is 169.254.73.50, the routing entry registration unit 312 determines whether an entry in which a network address 169.254.0.0/16 is adopted as the destination IP address already exists.

If the result of step S904 is a determination that the network entry has not been registered, the routing entry registration unit 312 adds the network entry to a routing table in which the IP address included as the destination (step S907). For example, in a case where the IP address is 169.254.73.50, a network entry the destination address of which is 169.254.0.0/16 is added to the routing table. Next, the routing entry registration unit 312 creates a host list in order to manage the network entry (step S910). The host list is a list of in-use IP addresses included in the network address designated by the network entry. Accordingly, entry information corresponding to the host entry is obtained by the network entry and the IP address that has been registered in the host list. In other words, a host entry is formed by a network entry and a host list. When creation of the network entry is thus completed, the existence confirmation unit 308 executes processing for confirming existence of a network entry (step S912). Processing for confirming existence of a network entry will be described later. When processing for confirming existence of a network entry ends, processing is exited.

If the result of step S904 is that the network exists, then it is determined whether the network entry is an interface identical with the interface that received the ARP packet (step S906). For example, if the interface that received the ARP packet is for the adhoc mode and the interface of the already existing network entry is the WLAN (adhoc mode), then it is judged that the interfaces are identical (that the interfaces match).

If the result of S906 is a determination that the interfaces do not match (that they are different), then the routing entry registration unit 312 registers the host entry (S909) in a manner similar to the first embodiment (step S406). When registration of the host entry is completed, the existence confirmation unit 308 executes existence confirmation processing (step S911) with regard to this host entry in a manner similar to the first embodiment (step S407, FIG. 5). When existence confirmation processing regarding the host entry ends, processing is exited. On the other hand, if the result of step S906 is a determination that the interfaces do match, then the routing entry registration unit 312 adds an IP address, which has been set in the TPA of the ARP packet, to the host list (step S908). Since existence confirmation processing relating to the host list has been executed at step S912, when addition of the IP address to the host list is completed at step S908, processing is exited, as mentioned above.

Figure 10:
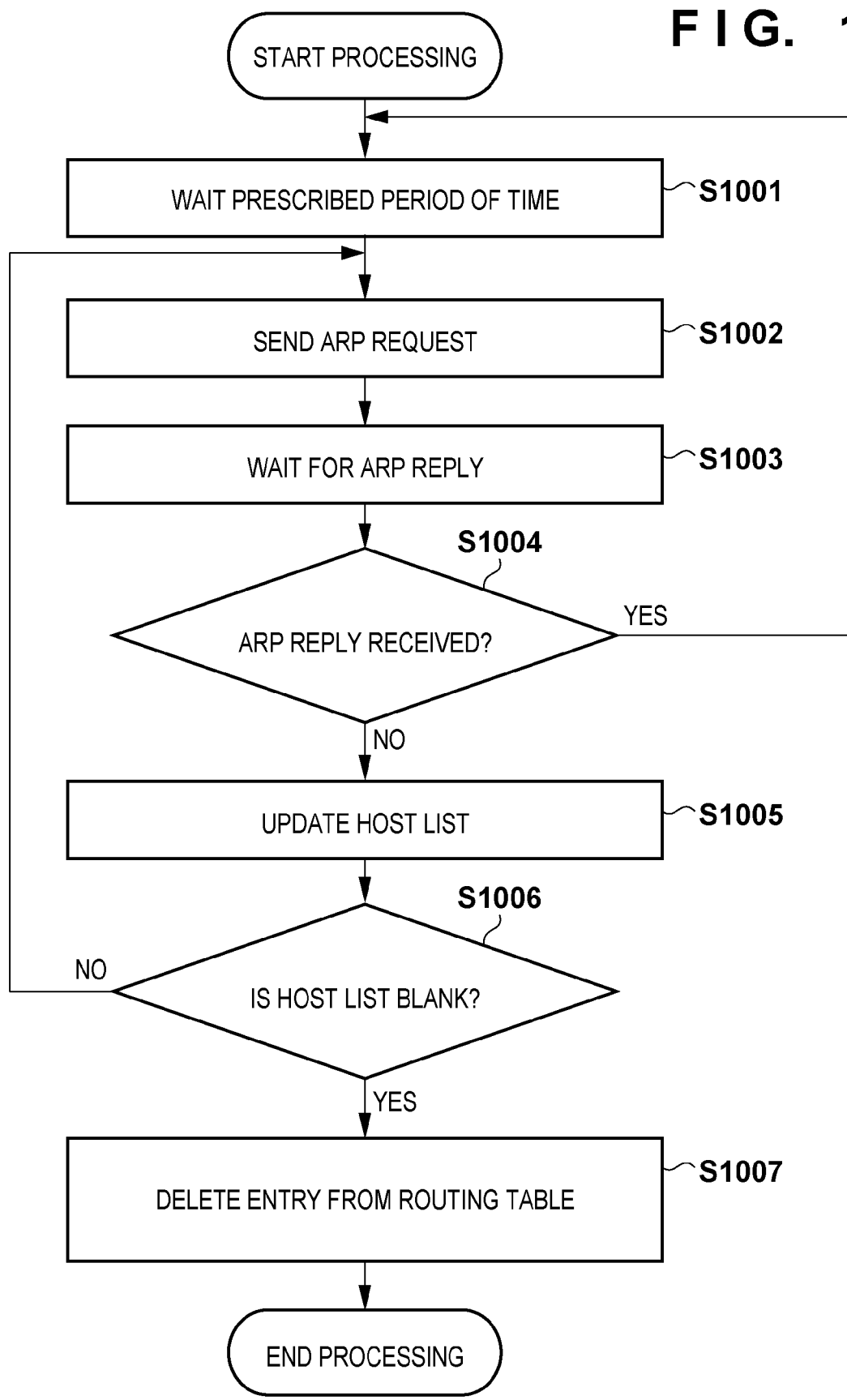
FIG. 10 is a flowchart illustrating processing executed by the apparatus according to the second embodiment.

Next, processing for confirming existence of a network entry in the second embodiment will be described with reference to the drawings. FIG. 10 is a flowchart illustrating processing (step S912) for confirming existence of a network entry by STA1 in the second embodiment.

First, the existence confirmation unit 308 of STA1 waits for a prescribed period of time (step S1001). When such standby for the prescribed period of time ends, the existence confirmation unit 308 sends ARP Request via the packet transmitter 311 in order to perform address resolution with respect to the IP address that is to undergo existence confirmation (step S1002). Here existence confirmation is applied to a single IP address in the host list. For example, the IP address at the top of the list may be adopted as the target of existence confirmation, or another method may be used to determine the IP address that is the target of existence confirmation.

Next, the existence confirmation unit 308 waits a fixed period of time for ARP Reply in a manner similar to step S503 (steps S1003, S1004). If ARP Reply is received within the fixed period of time, processing returns to step S1001 and the existence confirmation unit 308 again waits the prescribed period of time. If ARP Reply cannot be received within the fixed period of time ("NO" at step S1004), the existence confirmation unit 308 updates the host list by causing the routing entry deletion unit 313 to delete the IP address that is the object of existence confirmation from the host table (step S1005). Next, the existence confirmation unit 308 determines whether the updated host list is blank (step S1006). If the result of the determination at step S1006 is that the host list is not blank, processing returns to step S1002 and the existence confirmation unit 308 re-sends ARP Request. On the other hand, if the result of the determination at step S1006 is that the host list is blank, the routing entry deletion unit 313 deletes the relevant network entry from the routing table (step S1007). When deletion of the entry is completed, existence confirmation processing ends.

In accordance with the second embodiment set forth above, since a network entry and a host entry are used properly in accordance with the status of the apparatus, interface selection based upon a routing table can be performed efficiently. Further, in the case of a network entry, confirmation of existence is performed only with respect to a single IP address, which is the object of the same entry, in the host list. As a result, the processing load is alleviated in comparison with a case where a plurality of host entries are registered.

Further, in accordance with the foregoing embodiments, implementation is possible using a general-purpose API, which involves a socket interface and routing table management. As a result, data transmission control is simplified and it is possible to reduce development load.

In accordance with the foregoing embodiments, as set forth above, it is possible to transmit data from an application to an appropriate network even in a case where multiple networks communicate concurrently.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-250259, filed Nov. 8, 2010, which is hereby incorporated by reference herein in its entirety.

What is claimed is:

1. A communication apparatus capable of being simultaneously connected to and of communicating with a first network and a second network different from the first network, comprising:
  a detection unit configured to detect an address resolution of another communication apparatus in the second network;

a confirmation unit configured to confirm whether an address of a transmission source in the address resolution is in use in the first network; and a storage unit which, when data is transmitted to the address in a case where this address has been confirmed by the confirmation unit not to be in use, stores the fact that data is transmitted to the second network.

2. The apparatus according to claim 1, wherein the detection unit detects the address resolution of the another communication apparatus by receiving an address resolution protocol packet that has been transmitted by the another communication apparatus.

3. The apparatus according to claim 2, wherein the address is an IPv4 logical address, and the address resolution protocol is ARP (Address Resolution Protocol).

4. The apparatus according to claim 2, wherein the address is an IPv6 logical address, and the address resolution protocol is NDP (Neighbor Discovery Protocol).

5. The apparatus according to claim 1, further comprising a transmission unit which, when data is transmitted to the address of the another communication apparatus, transmits the data to the second network based upon information that has been stored in the storage unit.

6. The apparatus according to claim 1, further comprising:
a notification unit configured to notify of an address resolution request with respect to the another communication apparatus at a prescribed period in the second network;
a reception unit configured to receive a response to the address resolution request of which notification has been given by the notification unit; and
a deletion unit configured to delete information relating to the another communication apparatus, which information has been stored in the storage unit, in a case where the response has not been received.

7. The apparatus according to claim 1, wherein the address is a logical address; and
wherein the storage unit registers entry information, in which only the logical address is adopted as a destination logical address, in a routing table.

8. The apparatus according to claim 7, wherein the storage unit registers the entry information in the routing table in the form of a host entry in a case where a network entry corresponding to the logical address has already been registered in the routing table and, moreover, the network entry corresponds to an interface other than that of the second network; and in other cases, registers the entry information in the routing table, in correspondence with the logical address, by a network entry corresponding to an interface of the second network and a list in which the logical address has been registered.

9. The apparatus according to claim 1, further comprising a unit which, in a case where the address has been confirmed by the confirmation unit to be in use, reports this fact to the transmission source that requested this address.

10. The apparatus according to claim 1, wherein the first network is an infrastructure network of a wireless LAN.

11. The apparatus according to claim 1, wherein the first network is a wireless network and wherein the second network is a wireless network.

12. The apparatus according to claim 11, wherein, in a case where the apparatus communicates in the first network, the communication apparatus communicates with an apparatus which is participating to the first network as a station via an access point that formed the first network, and
wherein, in a case where the apparatus communicates in the second network, the apparatus directly communicates with an apparatus which is participating to the second network without through a relaying apparatus.

13. A method of controlling a communication apparatus capable of being simultaneously connected to and of communicating with a first network and a second network different from the first network, comprising:
detecting an address resolution of another communication apparatus in the second network;
confirming whether an address of a transmission source in the address resolution is in use in the first network; and
storing, when data is transmitted to the address in a case where this address has been confirmed not to be in use, the fact that data is transmitted to the second network.

14. A non-transitory computer-readable medium storing a program for causing a computer to execute each of the steps of a method of controlling a communication apparatus capable of being simultaneously connected to and of communicating with a first network and a second network different from the first network, the method comprising:
detecting an address resolution of another communication apparatus in the second network;
confirming whether an address of a transmission source in the address resolution is in use in the first network; and
storing, when data is transmitted to the address in a case where this address has been confirmed not to be in use, the fact that data is transmitted to the second network.

* * * * *